(12) United States Patent
On Au et al.

(10) Patent No.: US 6,505,189 B1
(45) Date of Patent: Jan. 7, 2003

(54) AGGREGATE JOIN INDEX FOR RELATIONAL DATABASES

(75) Inventors: Grace Kwan On Au, Rancho Palos Verdes, CA (US); Chi Kim Hoang, Palo Alto, CA (US)

(73) Assignee: NCR Corporation, Dayton, OH (US)

( * ) Notice: Subject to any disclaimer, the term of this patent is extended or adjusted under 35 U.S.C. 154(b) by 341 days.

(21) Appl. No.: 09/594,964

(22) Filed: Jun. 15, 2000

(51) Int. Cl.$^7$ ................................................ G06F 17/30
(52) U.S. Cl. .......................................................... 707/2
(58) Field of Search ............................. 707/2, 3, 4, 203

(56) References Cited

U.S. PATENT DOCUMENTS

| | | | |
|---|---|---|---|
| 5,241,648 A | | 8/1993 | Cheng et al. ................... 707/7 |
| 5,440,730 A | * | 8/1995 | Elmasri et al. ............. 707/203 |
| 5,666,525 A | | 9/1997 | Ross ............................... 707/2 |
| 5,710,915 A | * | 1/1998 | McElhiney .................... 707/3 |
| 5,870,747 A | | 2/1999 | Sundaresan ................. 707/101 |
| 5,983,215 A | | 11/1999 | Ross et al. ...................... 707/2 |
| 5,987,453 A | | 11/1999 | Krishna et al. ................ 707/4 |
| 6,289,334 B1 | * | 9/2001 | Reiner et al. ................... 707/3 |

OTHER PUBLICATIONS

A. Witkowski et al. "NCR 3700–The Next–Generation Industrial Database Computer," Proceeding of the 19$^{th}$ VLDB Conference, Dublin, Ireland, 1993, 14 pgs.

* cited by examiner

Primary Examiner—Diane D. Mizrahi
(74) Attorney, Agent, or Firm—Gates & Cooper

(57) ABSTRACT

The retrieval of data from a database in a computerized database management system is optimized through the use of an aggregate join index. The aggregate join index combines one or more commonly-used columns of the base tables with the results from one or more aggregation expressions pre-computed from one or more columns of the tables.

36 Claims, 3 Drawing Sheets

FIG. 2

200 (CUSTOMER_TABLE)

| CUSTKEY | NAME | ADDRESS | STATE |
|---|---|---|---|
| C1 | SMITH | ... | CA |
| C2 | JONES | ... | OH |
| C3 | MILLER | ... | CA |

202 (ORDER_TABLE)

| ORDERKEY | STATUS | ORDER DATE | PRICE | CUSTKEY |
|---|---|---|---|---|
| 1 | PENDING | 1/1/2000 | $100 | C1 |
| 2 | PENDING | 2/1/2000 | $200 | C2 |
| 3 | PENDING | 3/1/2000 | $300 | C1 |

204 (AGGREGATE_JOIN_INDEX)

| ROW COUNT | PRICESUM | ORDER DATE |
|---|---|---|
| 1 | $100 | 1/1/2000 |
| 2 | $500 | 2/1/2000 |

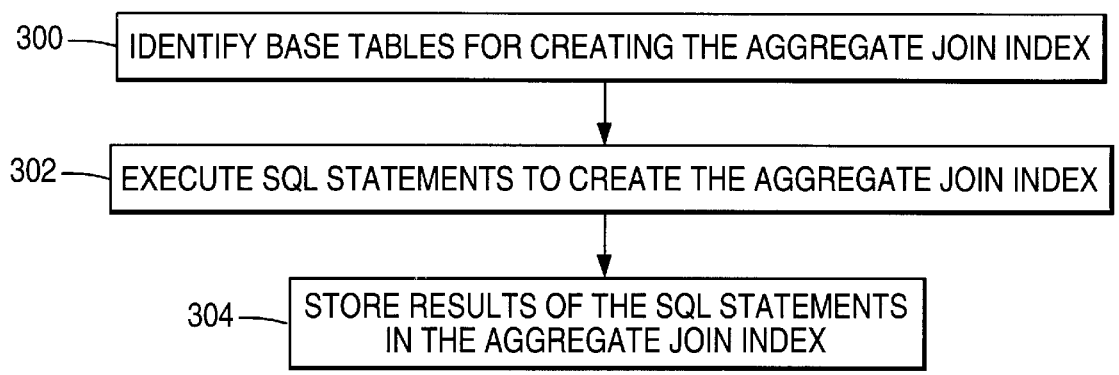
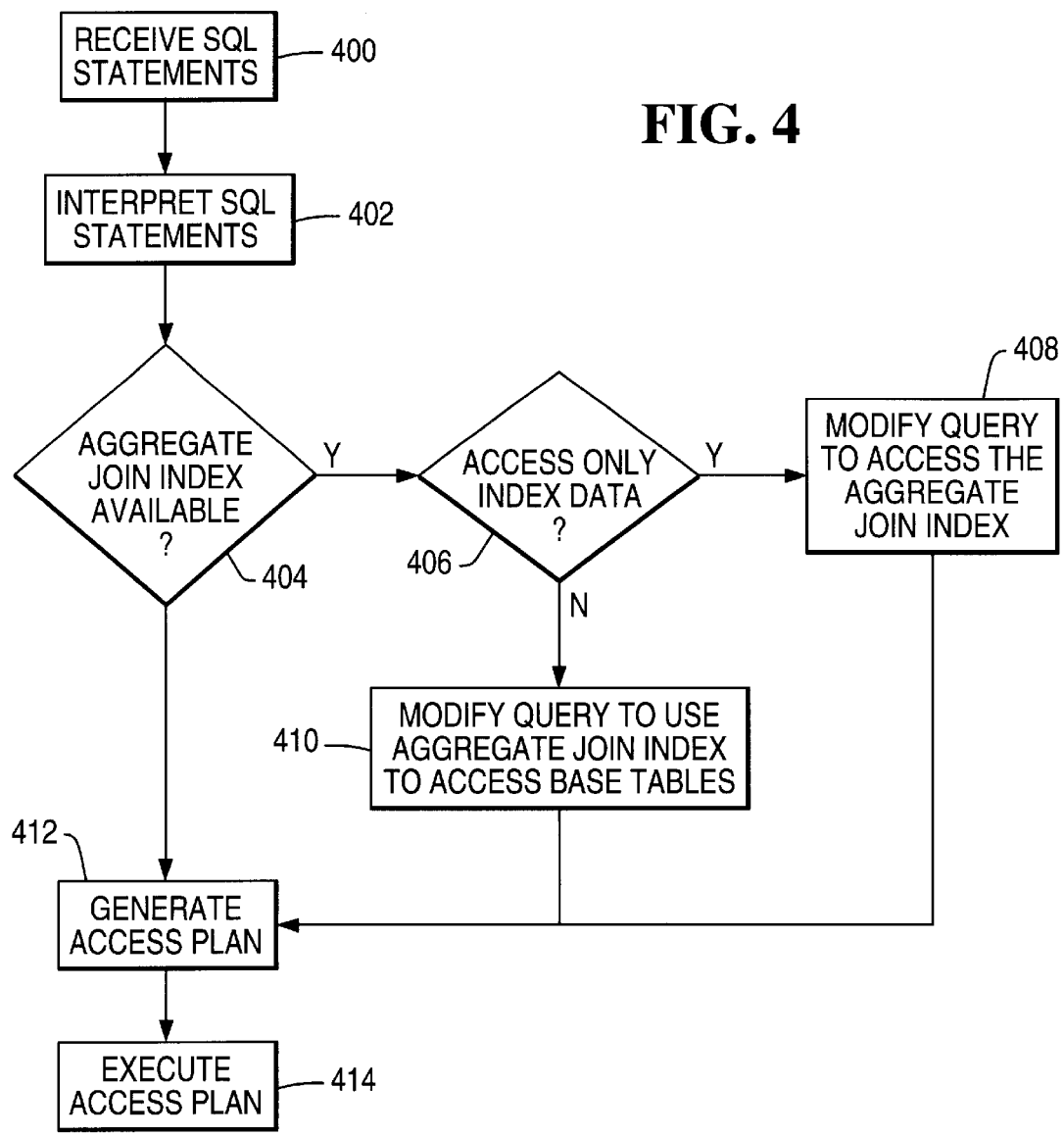

AGGREGATE JOIN INDEX FOR RELATIONAL DATABASES

CROSS REFERENCE TO RELATED APPLICATIONS

This application is related to the following commonly assigned patent applications, all of which are incorporated by reference herein:

application Ser. No. 09/073,113, entitled "A JOIN INDEX FOR RELATIONAL DATABASES", filed on May 5, 1998, by Chi Kim Hoang, and now U.S. Pat. No. 6,167,399, Pending U.S. patent application Ser. No. 09/594,299, entitled "COMMON SPOOL FILES FOR MAINTAINING JOIN INDEXES", filed on same date herewith, by Grace K. Au and Chi Kim Hoang, Pending U.S. patent application Ser. No. 09/594,963, entitled "VIRTUAL JOIN INDEX FOR RELATIONAL DATABASES", filed on same date herewith, by Ahmad Ghazal, Paul Sinclair, and Chi Kim Hoang,

BACKGROUND OF THE INVENTION

1. Field of the Invention

This invention relates in general to computerized relational databases, and in particular, to a method, apparatus and program product for performing queries against a relational database using an aggregate join index.

2. Description of Related Art

Relational DataBase Management Systems (RDBMS) using a Structured Query Language (SQL) interface are well known in the art. The SQL interface has evolved into a standard language for RDBMS software and has been adopted as such by both the American National Standards Institute (ANSI) and the International Standards Organization (ISO).

In an RDBMS, all data is externally structured into tables. A table in a relational database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT<clause>FROM<clause>WHERE<clause>GROUP BY<clause>HAVING<clause>ORDER BY<clause>." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

A join operation is usually implied by naming more than one table in the FROM clause of a SELECT statement. A join operation makes it possible to combine tables by combining rows from one table with another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

Join indexes have been used to improve the performance of join operations in RDBMS's. A description of join indexes, including a novel join index, can be found in co-pending and commonly-assigned pending U.S. patent application Ser. No. 09/073,113, filed on May 5, 1998, by Chi Kim Hoang, entitled "A JOIN INDEX FOR RELATIONAL DATABASES", which application is incorporated by reference herein.

Techniques have been developed for maximizing performance using join indexes. However, there remains a need in the art for additional optimization techniques through the use of join indexes.

SUMMARY OF THE INVENTION

To overcome the limitations in the prior art described above, and to overcome other limitations that will become apparent upon reading and understanding the present specification, the present invention discloses methods, apparatus, articles of manufacture, and data structures related to the creation and use of an aggregate join index. The aggregate join index combines one or more commonly-used columns of one or more tables with the results from one or more aggregation expressions pre-computed from one or more columns of the tables.

BRIEF DESCRIPTION OF THE DRAWINGS

Referring now to the drawings in which like reference numbers represent corresponding parts throughout:

FIG. 2 illustrates the structure of two base tables and an aggregate join index according to the preferred embodiment of the present invention;

FIG. 3 is a flowchart illustrating the steps necessary for the creation of the aggregate join index according to the preferred embodiment of the present invention; and FIG. 4 is a flowchart illustrating the steps necessary for the use of the aggregate join index according to the preferred embodiment of the present invention.

DETAILED DESCRIPTION OF THE PREFERRED EMBODIMENT

Figure 1:
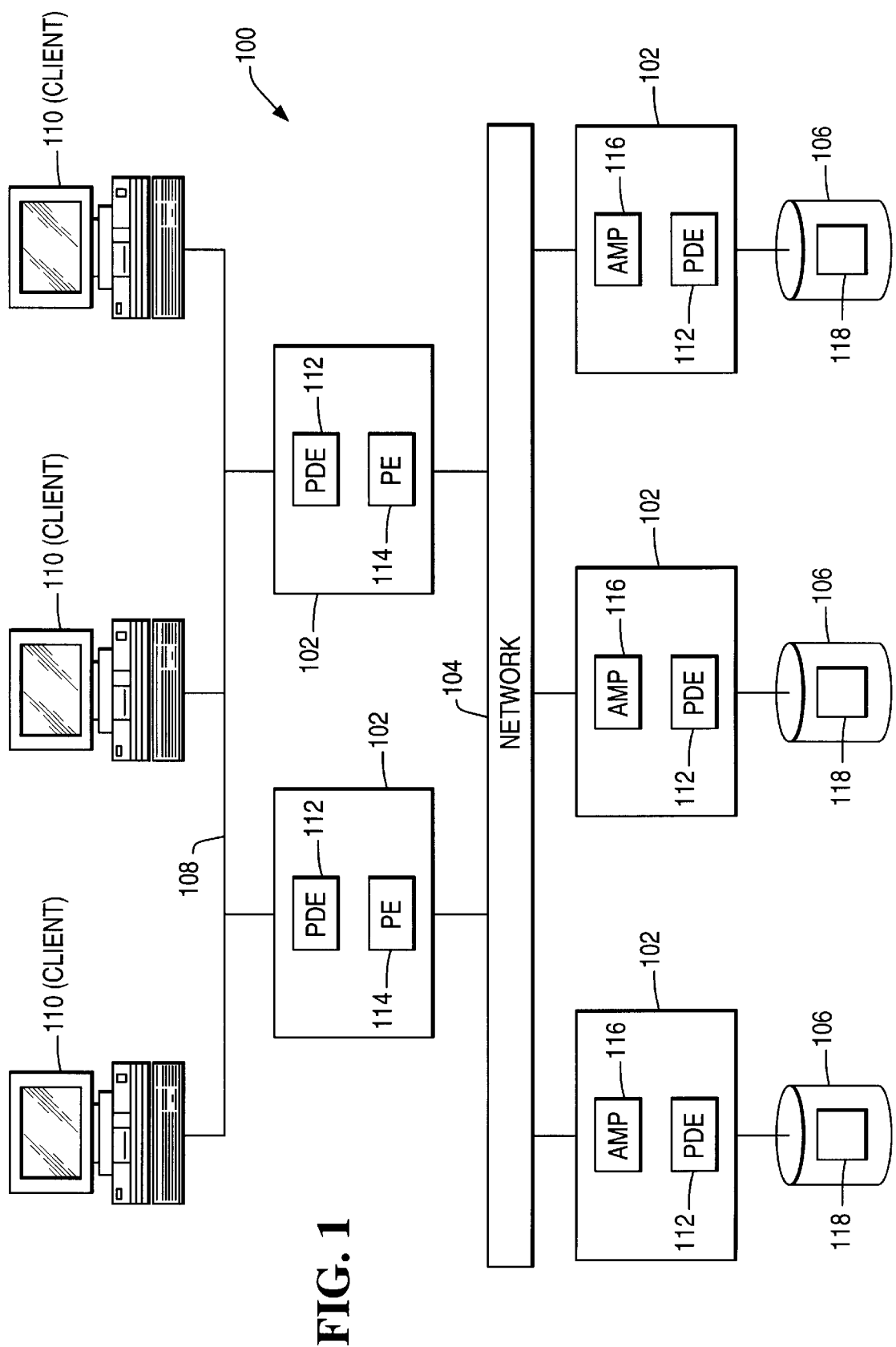
FIG. 1 illustrates an exemplary hardware and software environment according to the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention describes aggregate join indexes, which provide dramatic performance improvements to queries that involve aggregation operations. In general, a query having one or more aggregate expressions is expensive to perform, because it requires sorting the data by a grouping key before the aggregate expression can be computed. In a parallel processing system, where data are distributed across multiple processors, extra costs for processing the query are incurred when a single processor does not have all the rows that belong to the same group. In this situation, global aggregation that involves redistributing data across processors is also needed.

The present invention allows users to perform some or all of the aggregation operations (and possibly join operations as well) when the aggregate join index is defined, by specifying aggregate expressions in the definition of the aggregate join index. The results of the aggregate expressions are computed from one or more tables and then stored in the aggregate join index across multiple processors, along with the columns that are used as the aggregation key and a row count of each aggregated group. As the tables are updated, the results are incrementally updated using the updated data in the tables, and then the aggregate join index is incrementally updated using the results. For many applications, the update maintenance overhead associated with the aggregate join index can be justified by dramatic improvements to the query response time resulting from the use of aggregate join index.

Environment

FIG. 1 illustrates an exemplary hardware and software environment that could be used with the preferred embodiment of the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by a Relational DataBase Management System (RDBMS) executed by the system 100.

In the preferred embodiment of the present invention, the RDBMS comprises the Teradata® product offered by NCR Corporation, and includes one or more Parallel Database Extensions (PDEs) 112, Parsing Engines (PEs) 114, and Access Module Processors (AMPs) 116. These components of the RDBMS perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to an AMP 116. In the preferred embodiment, data partitioning and repartitioning may be performed, in order to enhance parallel processing across multiple AMPs 116. For example, the data may be hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Aggregate Join Index

In the present invention, a standard join index is extended to a new structure known as an aggregate join index. The aggregate join index stores the results from one or more aggregation expressions computed from one or more columns of one or more tables, along with the columns that are used as the aggregation key and a row count of each aggregated group. These pre-computed results stored in the aggregate join index can then be used to satisfy a subsequent query, rather than having to compute the aggregate expressions from columns of the tables referenced in the query.

FIG. 2 illustrates the structure of two base tables, CUSTOMER_TABLE 200 and ORDER_TABLE 202, and an aggregate join index, AGGREGATE_JOIN_INDEX 204. The base tables 200 and 202 are created using the following SQL statements:

CREATE TABLE CUSTOMER_TABLE(CUSTKEY INTEGER NOT NULL,
  NAME CHAR(26) CASESPECIFIC NOT NULL,
  ADDRESS VARCHAR(41),
  STATE VARCHAR(2))
UNIQUE PRIMARY INDEX(CUSTKEY);
CREATE TABLE ORDER_TABLE(ORDERKEY INTEGER NOT NULL,
  STATUS CHAR(1) CASESPECIFIC,
  ORDERDATE DATE FORMAT 'YYYY-MM-DD' NOT NULL,
  PRICE DECIMAL(13,2) NOT NULL,
  CUSTKEY INTEGER)
UNIQUE PRIMARY INDEX(ORDERKEY);

A simple query comprising a SELECT statement can be defined on the base tables 200 and 202, wherein the query performs a join operation:

SELECT COUNT(*), SUM(PRICE)
FROM ORDER_TABLE, CUSTOMER_TABLE
WHERE ORDER_TABLE.CUSTKEY=CUSTOMER_TABLE. CUSTKEY
  AND ORDERDATE>DATE '2000-01-01'
  AND ORDERDATE<DATE '2000-03-01';

Without an aggregate join index, a typical access plan for the above query would redistribute the ORDER_TABLE 202 into a spool file, sort the spool file on CUSTKEY, and then perform a merge join between the spool file and the CUSTOMER_TABLE 200. Thereafter, the aggregate expression, SUM(PRICE), would be computed from the results from the merge join.

However, an aggregate join index 204 can be defined on a binary join result of the two base tables 200 and 202 as follows:

CREATE JOIN INDEX AGGREGATE_JOIN_INDEX AS
  SELECT COUNT(*) AS ROWCOUNT, SUM (PRICE) AS PRICESUM, ORDERDATE,
  FROM ORDER_TABLE, CUSTOMER_TABLE
  WHERE ORDER_TABLE.CUSTKEY=CUSTOMER_TABLE.CUSTKEY
  GROUP BY ORDERDATE
  ORDER BY ORDERDATE;

Using the aggregate join index 204, the RDBMS can generate a new access plan for the above query that accesses the aggregate join index 204, rather than the tables 200 and 202, which is much smaller than either one of the base tables 200 and 202. The access plan, for example, could correspond to the query shown below.

SELECT SUM(ROWCOUNT), SUM(SUMPRICE)
FROM AGGREGATE_JOIN_INDEX
WHERE ORDERDATE>DATE '2000-01-01' AND
  ORDERDATE<DATE '2000-03-01';

In determining whether an aggregate join index 204 can be used to satisfy a query, the following rules are applied:

(1) An aggregate join index cannot be used to substitute for the base tables of a non-aggregate query.
(2) An aggregate join index can be used if it was created using the same set or a subset of joins as specified in the query.
(3) If an aggregate join index was created using a subset of joins as specified in the query, all fields specified in any remaining join conditions of the query must match the GROUP BY and SELECT clauses used to create the aggregate join index.
(4) If an aggregate join index was created using the same set of joins as specified in the query, the same or a subset of the GROUP BY fields used to create the aggregate join index must be specified in the query.
(5) An aggregate join index must contain all the fields of the tables referenced by the query. When matching fields and expressions between the aggregate join index and the query, the following rules apply:
  (i) Commutative for simple operators: addition and multiplication.
  (ii) COUNT(*) and COUNT of all non-null expressions are used interchangeably.
  (ii) A numeric expression from the aggregate join index that is converted to FLOAT can be used to match any same expression defined with or without the conversion from the query.
  (iv) An AVG (average) expression from the query will be converted to a SUM/COUNT expression.
  (v) SUM(0) from the query will be converted to a constant with value 0.
  (vi) SUM(const) from the query will be converted to const* COUNT(*).
  (vii) The SUM or COUNT function from SUM(CASE expression) or COUNT(CASE expression) may be pushed to all the resulting expression of the CASE expression, so that a match can be found. For example, the following expression: (CASE WHEN x1=1 THEN 1 ELSE 0) may be converted to CASE WHEN x1=1 THEN SUM(1) ELSE SUM(0) in order to find a match.
  (viii) The condition exp>='YYYY0101' may be converted to 'Extract(Year From exp)>=YYYY'
  (ix) The condition exp>'YYYY1231' may be converted to 'Extract(Year From exp)>YYYY'
  (x) The condition exp<'YYYY0101' may be converted to 'Extract(Year From exp)<YYYY'
  (xi) The condition exp<='YYYY1231' may be converted to 'Extract(Year From exp)<=YYYY'
  (xii) The condition exp>='YYYYMM01' may be converted to 'Extract(Year From exp)>YYYY OR (Extract (Year From exp)=YYYY AND Extract(Month From exp)>=MM)'
  (xiii) The condition exp>'YYYYMMLD' where LD is the last day of the month specified by MM may be converted to 'Extract(year From exp)>YYYY OR (Extract (Year From exp)=YYYY AND Extract(Month From exp)>MM)'
  (xiv) The condition exp<='YYYYMMLD' where LD is the last day of the month specified by MM maybe converted to 'Extract(Year From exp)<YYYY OR (Extract(Year From exp)=YYYY AND Extract(Month From exp)<=MM)'

(xv) The condition exp<'YYYYMM01' maybe converted to 'Extract(Year From exp)<YYYY OR (Extract(Year From exp)=YYYY AND Extract(Month From exp) <MM)'

Logic of the Relational Database Manangement System

Flowcharts which illustrate the logic of the RDBMS creating and using an aggregate join index according to the present invention are shown in FIGS. 3 and 4. Those skilled in the art will recognizie that this logic is provided for illustrative purposes only and that different logic may be used to accomplish the same results.

Creating the Aggregate Join Index

FIG. 3 is a flowchart illustrating the steps performed by the RDBMS to create an aggregate join index according to the present invention.

Block 300 represents the RDBMS identifying the base tables from which to create the aggregate join index.

Block 302 represents the RDBMS performing one or more SQL statements to create the aggregate join index, wherein the query comprises, for example, the following:

CREATE<AGGREGATE JOIN INDEX>AS
   SELECT<COMMONLY-USED COLUMNS C1, C2, . . . >
   FROM<TABLE #1><TABLE #2>
   WHERE<FOREIGN KEY>=<PRIMARY KEY>
   GROUP BY<COMMONLY-USED COLUMNS C1, C2, . . . >

Those skilled in the art will recognize that the other tables and other joins may be substituted for those indicated above.

Finally, Block 304 represents the RDBMS storing the results of the executed SQL statement in the aggregate join index for later use.

Accessing Data using the Aggregate Join Index

FIG. 4 is a flowchart illustrating the steps performed by the RDBMS to use an aggregate join index for accessing data according to the present invention.

Block 400 represents the RDBMS receiving one or more SQL statements comprising, for example, a query against one or more base tables in the relational database.

Block 402 represents the RDBMS interpreting the SQL statements.

Block 404 is a decision block that represents the RDBMS determining whether an aggregate join index can be used to answer the SQL statements, wherein the RDBMS compares the definition of the aggregate join index with the SQL statements to determine whether the rules described above are satisfied. If not, control transfers to Block 412, which represents the RDBMS performing standard processing for the SQL statements; otherwise, control transfers to Block 406.

Block 406 is a decision block that represents the RDBMS determining whether the SQL statements access only data that can be found in the aggregate join index. If so, control transfers to Block 408, which represents the RDBMS modifying the SQL statements to access data only from the aggregate join index rather than the base tables; otherwise, control transfers to Block 410, which represents the RDBMS modifying the SQL statements to retrieve data from the base tables using the aggregate join index.

Block 412 represents the RDBMS generating an access plan that enables the RDBMS to access the data from the relational database.

Block 414 represents the RDBMS executing the plan, retrieving the results from the relational database, and then returning the result to the user or client application.

Conclusion

This concludes the description of the preferred embodiment of the invention. The following paragraph describes an alternative embodiment for accomplishing the same invention.

In one alternative embodiment, any type of computer, such as a mainframe, minicomputer, or personal computer, could be used to implement the present invention. In addition, any database management system (DBMS) that performs join operations or aggregation operations could benefit from the present invention.

In summary, the present invention discloses methods, apparatus, articles of manufacture, and data structures related to the creation and use of an aggregate join index. The aggregate join index combines one or more commonly-used columns of one or more tables with the results from one or more aggregation expressions pre-computed from one or more columns of the tables.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing retrieval of data from a database in a computerized database management system, comprising:
   (a) computing one or more aggregation expressions from one or more columns of one or more tables in the database; and
   (b) creating an aggregate join index for the tables by combining one or more commonly-used columns of the tables with results from the aggregation expressions.

2. The method of claim 1 above, wherein a definition of the aggregate join index specifies the aggregate expressions.

3. The method of claim 1 above, wherein the creating step further comprises creating the aggregate join index by performing a join operation on the tables.

4. The method of claim 1 above, further comprising incrementally updating the aggregate join index when the tables are updated.

5. A method of optimizing retrieval of data from a database in a computerized database management system, comprising:
   (a) receiving a query into a computer; and
   (b) processing the query using an aggregate join index for one or more tables referenced in the query, wherein the aggregate join index combines one or more commonly-used columns of the tables with results from one or more aggregation expressions computed from one or more columns of the tables.

6. The method of claim 5 above, wherein the processing step further comprises satisfying the query with the results from the aggregate expressions stored in the aggregate join index rather than the tables referenced in the query.

7. The method of claim 6, wherein the results from the aggregate expressions stored in the aggregate join index are used to satisfy the query, when the query includes the aggregate expressions, the aggregate join index is created by a same set of join operations as specified in the query, the aggregate expressions are defined by a same set or a superset of GROUP BY fields as specified in the query, and the aggregate join index contains all fields selected by the query.

8. The method of claim 6, wherein the results from the aggregate expressions stored in the aggregate join index are used to satisfy the query, when the query includes the aggregate expressions, the aggregate join index is created by a subset of join operations as specified in the query, the aggregate join index is created by a same set or a superset of GROUP BY fields and SELECT fields as specified in the query with respect to a set of tables defined by a subset of join conditions, and the aggregate join index contains fields needed by any remaining join conditions specified in the query.

9. The method of claim 6, wherein the results from the aggregate expressions stored in the aggregate join index are used to satisfy the query, when the query includes the aggregate expressions, the aggregate join index is created by a same set or subset of join operations as specified in the query, and the query does not specify a GROUP BY clause.

10. A computerized database management system for optimizing retrieval of data from a database, comprising:
   (a) logic, performed by the database management system, for:
      (1) computing one or more aggregation expressions from one or more columns of one or more tables in the database; and
      (2) creating an aggregate join index for the tables by combining one or more commonly-used columns of the tables with results from the aggregation expressions.

11. The system of claim 10 above, wherein a definition of the aggregate join index specifies the aggregate expressions.

12. The system of claim 10 above, wherein the logic for creating further comprises logic for creating the aggregate join index by performing a join operation on the tables.

13. The system of claim 10 above, further comprising logic for incrementally updating the aggregate join index when the tables are updated.

14. A computerized database management system for optimizing retrieval of data from a database, comprising:
   (a) logic, performed by the database management system, for:
      (1) receiving a query into a computer; and
      (2) processing the query using an aggregate join index for one or more tables referenced in the query, wherein the aggregate join index combines one or more commonly-used columns of the tables with results from one or more aggregation expressions computed from one or more columns of the tables.

15. The system of claim 14 above, wherein the logic for processing further comprises logic for satisfying the query with the results from the aggregate expressions stored in the aggregate join index rather than the tables referenced in the query.

16. The system of claim 15 above, wherein the results from the aggregate expressions stored in the aggregate join index are used to satisfy the query, when the query includes the aggregate expressions, the aggregate join index is created by a same set of join operations as specified in the query, the aggregate expressions are defined by a same set or a superset of GROUP BY fields as specified in the query, and the aggregate join index contains all fields selected by the query.

17. The system of claim 15 above, wherein the results from the aggregate expressions stored in the aggregate join index are used to satisfy the query, when the query includes the aggregate expressions, the aggregate join index is created by a subset of join operations as specified in the query, the aggregate join index is created by a same set or a superset of GROUP BY fields and SELECT fields as specified in the query with respect to a set of tables defined by a subset of join conditions, and the aggregate join index contains fields needed by any remaining join conditions specified in the query.

18. The system of claim 15 above, wherein the results from the aggregate expressions stored in the aggregate join index are used to satisfy the query, when the query includes the aggregate expressions, the aggregate join index is created by a same set or subset of join operations as specified in the query, and the query does not specify a GROUP BY clause.

19. An article of manufacture embodying logic for performing a method of optimizing retrieval of data from a database in a computerized database management system, the method comprising:
   (a) computing one or more aggregation expressions from one or more columns of one or more tables in the database; and
   (b) creating an aggregate join index for the tables by combining one or more commonly-used columns of the tables with results from the aggregation expressions.

20. The article of manufacture of claim 19 above, wherein a definition of the aggregate join index specifies the aggregate expressions.

21. The article of manufacture of claim 19 above, wherein the creating step further comprises creating the aggregate join index by performing a join operation on the tables.

22. The article of manufacture of claim 19 above, further comprising incrementally updating the aggregate join index when the tables are updated.

23. An article of manufacture embodying logic for performing a method of optimizing retrieval of data from a database in a computerized database management system, the method comprising:
   (a) receiving a query into a computer; and
   (b) processing the query using an aggregate join index for one or more tables referenced in the query, wherein the aggregate join index combines one or more commonly-used columns of the tables with results from one or more aggregation expressions computed from one or more columns of the tables.

24. The article of manufacture of claim 23 above, wherein the processing step further comprises satisfying the query with the results from the aggregate expressions stored in the aggregate join index rather than the tables referenced in the query.

25. The article of manufacture of claim 24 above, wherein the results from the aggregate expressions stored in the aggregate join index are used to satisfy the query, when the query includes the aggregate expressions, the aggregate join index is created by a same set of join operations as specified in the query, the aggregate expressions are defined by a same set or a superset of GROUP BY fields as specified in the query, and the aggregate join index contains all fields selected by the query.

26. The article of manufacture of claim 24 above, wherein the results from the aggregate expressions stored in the aggregate join index are used to satisfy the query, when the query includes the aggregate expressions, the aggregate join index is created by a subset of join operations as specified in the query, the aggregate join index is created by a same set or a superset of GROUP BY fields and SELECT fields as specified in the query with respect to a set of tables defined by a subset of join conditions, and the aggregate join index contains fields needed by any remaining join conditions specified in the query.

27. The article of manufacture of claim 24 above, wherein the results from the aggregate expressions stored in the aggregate join index are used to satisfy the query, when the query includes the aggregate expressions, the aggregate join index is created by a same set or subset of join operations as specified in the query, and the query does not specify a GROUP BY clause.

28. A data structure stored in a memory for use by a database management system executed by a computer, the data structure comprising an aggregate join index for one or more tables referenced in the query, wherein the aggregate join index combines one or more commonly-used columns of the tables with results from one or more aggregation expressions computed from one or more columns of the tables.

29. The data structure of claim 28 above, wherein a definition of the aggregate join index specifies the aggregate expressions.

30. The data structure of claim 28 above, wherein the aggregate join index is created by performing a join operation on the tables.

31. The data structure of claim 28 above, wherein the aggregate join index is incrementally updated when the tables are updated.

32. The data structure of claim 28 above, wherein a query is processed using the aggregate join index.

33. The data structure of claim 32 above, wherein the query is satisfied with the results from the aggregate expressions stored in the aggregate join index rather than the tables referenced in the query.

34. The data structure of claim 33 above, wherein the results from the aggregate expressions stored in the aggregate join index are used to satisfy the query, when the query includes the aggregate expressions, the aggregate join index is created by a same set of join operations as specified in the query, the aggregate expressions are defined by a same set or a superset of GROUP BY fields as specified in the query, and the aggregate join index contains all fields selected by the query.

35. The data structure of claim 33, wherein the results from the aggregate expressions stored in the aggregate join index are used to satisfy the query, when the query includes the aggregate expressions, the aggregate join index is created by a subset of join operations as specified in the query, the aggregate join index is created by a same set or a superset of GROUP BY fields and SELECT fields as specified in the query with respect to a set of tables defined by a subset of join conditions, and the aggregate join index contains fields needed by any remaining join conditions specified in the query.

36. The data structure of claim 33 above, wherein the results from the aggregate expressions stored in the aggregate join index are used to satisfy the query, when the query includes the aggregate expressions, the aggregate join index is created by a same set or subset of join operations as specified in the query, and the query does not specify a GROUP BY clause.

* * * * *